United States Patent
Mori et al.

(10) Patent No.: US 8,693,680 B2
(45) Date of Patent: Apr. 8, 2014

(54) TELEPHONE

(75) Inventors: Toshihide Mori, Fukuoka (JP);
 Masanori Settsu, Fukuoka (JP); Kouji Fukushima, Fukuoka (JP); Yasunori Tsukamoto, Fukuoka (JP)

(73) Assignee: Panasonic Corporation, Osaka (JP)

( * ) Notice: Subject to any disclaimer, the term of this patent is extended or adjusted under 35 U.S.C. 154(b) by 141 days.

(21) Appl. No.: 13/386,008

(22) PCT Filed: Jul. 20, 2010

(86) PCT No.: PCT/JP2010/004656
 § 371 (c)(1),
 (2), (4) Date: Jan. 19, 2012

(87) PCT Pub. No.: WO2011/010451
 PCT Pub. Date: Jan. 27, 2011

(65) Prior Publication Data
 US 2012/0121078 A1 May 17, 2012

(30) Foreign Application Priority Data
 Jul. 21, 2009 (JP) .................................. 2009-169889

(51) Int. Cl.
 *H04M 1/04* (2006.01)
 *H04M 1/05* (2006.01)
 *H04M 1/02* (2006.01)
 *H04M 1/60* (2006.01)
(52) U.S. Cl.
 CPC .............. *H04M 1/05* (2013.01); *H04M 1/0279* (2013.01); *H04M 1/6041* (2013.01)
 USPC .............................. 379/455; 379/449; 379/454
(58) Field of Classification Search
 USPC .............. 379/433.01, 441, 446, 447, 449, 54, 379/455; 455/575.1
 See application file for complete search history.

(56) References Cited

U.S. PATENT DOCUMENTS

| 5,115,465 A | 5/1992 | Freer |
| 6,278,779 B1 | 8/2001 | Bryant et al. |
| 2002/0141572 A1 | 10/2002 | Rogalski |

FOREIGN PATENT DOCUMENTS

| JP | 09-331160 | 12/1997 |
| JP | 2004-207861 | 7/2004 |
| JP | 2004-297311 | 10/2004 |
| JP | 3108725 | 2/2005 |

OTHER PUBLICATIONS

International Search Report dated Aug. 24, 2010.
Extended European Search Report, dated Jul. 10, 2013, for corresponding European Application No. 10802072.8-1858/2458827, 7 pages.

*Primary Examiner* — Tuan D Nguyen
(74) *Attorney, Agent, or Firm* — Seed IP Law Group PLLC

(57) ABSTRACT

The present invention relates to a telephone and it is an object to make a speech without dropping a telephone even when the telephone miniaturized.

Then, in order to achieve the object, the present invention includes a main body case 5, a microphone 8 and a receiver 9 provided on a front surface side of the main body case 5. A display part 7 is arranged between the receiver 9 and the microphone 8. The microphone 8, the receiver 9 and the display part 7 are provided on the front surface of the main body case 5, 50 or 51. On a back surface of the main body case 5, 50 or 51, a slip preventing part 13 that prevents the telephone from being dropped is provided. The slip preventing part 13 is arranged in an opposite side to the display part 7 on the back surface of the main body case 5, 50 or 51.

20 Claims, 30 Drawing Sheets

(a)

(b)

TELEPHONE

TECHNICAL FIELD

The present invention relates to a telephone preferably suitably used when the telephone is employed by holding between an ear and a shoulder, for instance, in order to make a note.

Usually, in a telephone of this kind, a telephone is known that has a rubber plate fixed to a back surface side of a main body case as a slip preventing unit (for instance, patent literature 1).

Namely, when the rubber plate is fixed to the back surface side of the main body case, if the main body case is held between the ear and the shoulder, for instance, in order to take notes, the telephone hardly drops due to a frictional force of the rubber plate.

LITERATURE OF RELATED ART

Patent Literature

Patent Literature 1: U.S. Pat. No. 5,115,465

SUMMARY OF THE INVENTION

Problems that the Invention is to Solve

In recent years, a telephone such as a portable telephone or a subordinate device of a cordless telephone tends to be miniaturized. Since small telephones are ordinarily provided with display parts, most of them are thin. In such telephones, when the slip preventing unit is merely provided on the back surface side of the main body case, the telephone is inconveniently hardly held between the ear and the shoulder, so that the telephone cannot be easily held.

Thus, it is an object of the present invention to make a speech without dropping a telephone even when the telephone is miniaturized.

Means for Solving the Problems

In order to achieve the above-described object, the present invention provides a telephone for making an audio speech that includes a main body case having a front surface and a back surface, wherein the front surface includes a receiver that receives an input of an audio, a microphone that outputs the audio and a display part that displays an image, the back surface includes a slip preventing part that prevents the telephone from being dropped, the display part is arranged between the receiver and the microphone and the slip preventing part is arranged in an opposite side to the display part in the back surface.

Advantage of the Invention

As described above, in the present invention, since the slip preventing part is provided in the opposite side to the display part in the back surface of the main body case, the telephone can be firmly held between the entire part of a face and a shoulder. Thus, even when the telephone is miniaturized, a user can prevent the telephone from being dropped to make a speech.

MODE FOR CARRYING OUT THE INVENTION

Now, an embodiment of the present invention will be described below by using attached drawings.

First Embodiment

Figure 1:
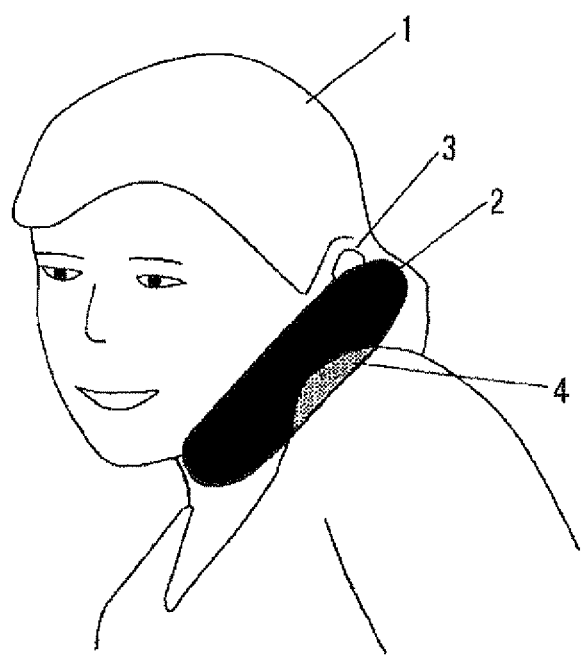
FIG. 1 is a perspective view showing a using state of a telephone in a first embodiment.
Figure 2:
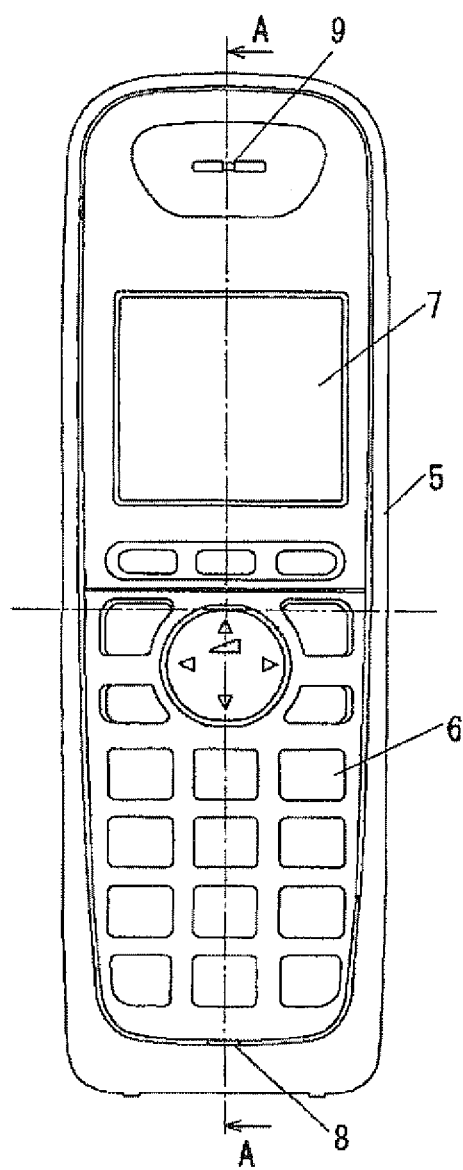
FIG. 2 is a front view of the telephone in the first embodiment.
Figure 3:
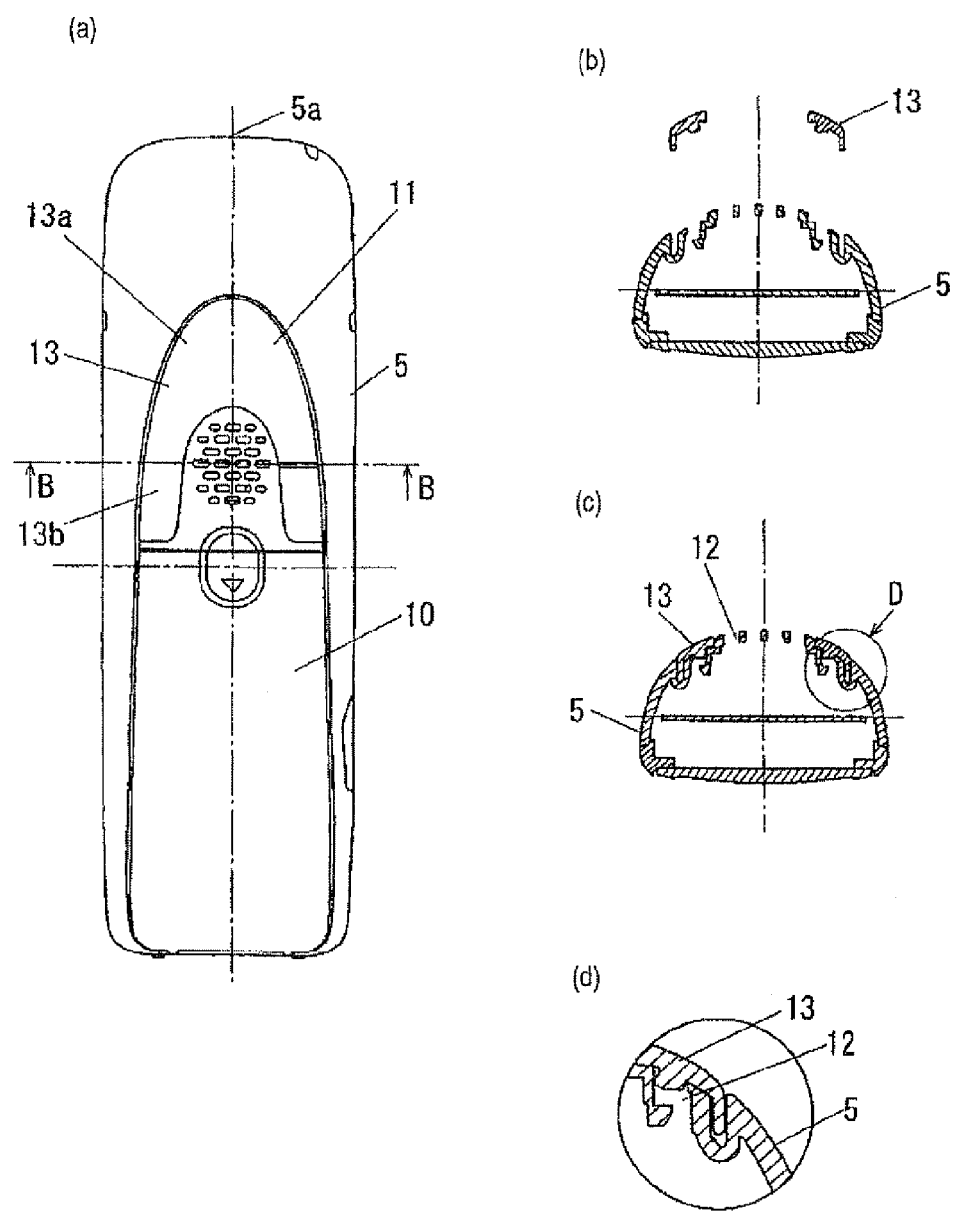
FIG. 3(a) is a rear view of the telephone in the first embodiment.
FIG. 3(b) is a sectional view taken along a line B-B in FIG. 3(a) when a slip preventing part is removed.
FIG. 3(c) is a sectional view taken along a line B-B in FIG. 3(a) when the slip preventing part is attached.
FIG. 3(d) is an enlarged sectional view of a part D in FIG. 3(c).
Figure 4:
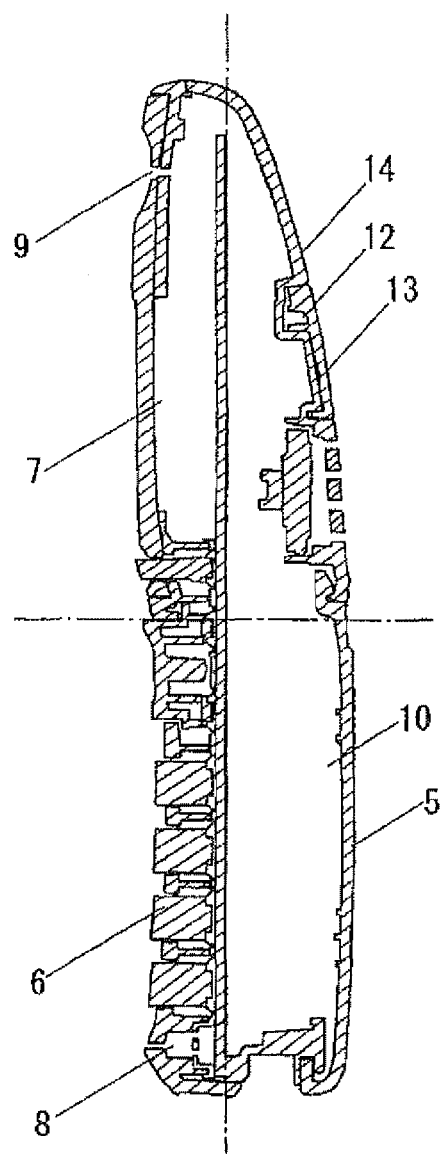
FIG. 4 is a side sectional view (a sectional view taken along a line A-A in FIG. 2) of the telephone in the first embodiment.

FIG. 1 shows a state that a user 1 takes notes to make a speech, for instance. At this time, the user uses and holds a telephone 2 according to a first embodiment of the present invention between an ear 3 and a shoulder 4.

The telephone 2 has a structure as shown in FIGS. 2 to 7(a) to 7(g). As can be understood from FIG. 2 and FIG. 3(a) of them, a main body case 5 has a substantially rectangular form in a vertical direction.

In a lower part of a front surface side of the main body case 5, a key operating part 6 is arranged, a display part 7 is arranged in an upper part, a microphone 8 is arranged in a lower part of the key operating part 6 and a receiver 9 is arranged in an upper part of the display part 7, respectively.

Further, in a lower part of a back surface side of the rectangular shaped main body case 5, a power source part 10 is provided. Further, in an upper part of a center in the back surface side of the rectangular main body case 5, a slip preventing unit 11 is provided. When the above-described telephone 2 is used and held between the ear 3 and the shoulder 4, the slip preventing unit 11 comes into contact with the shoulder.

Figure 5:
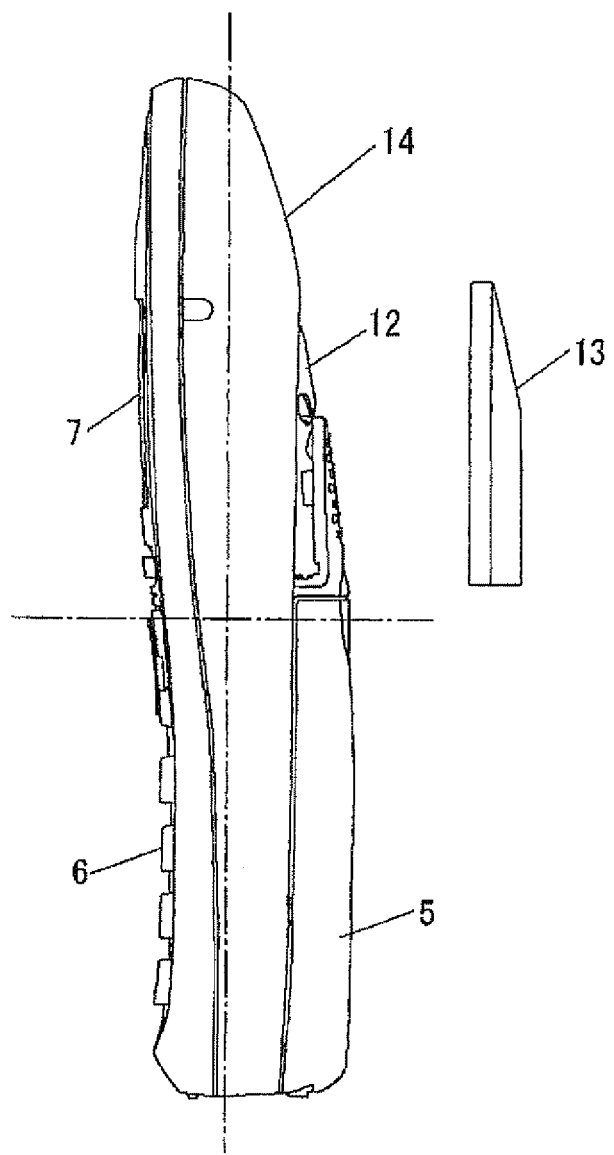
FIG. 5 is a side view of the telephone when the slip preventing part is removed in the first embodiment.
Figure 6:
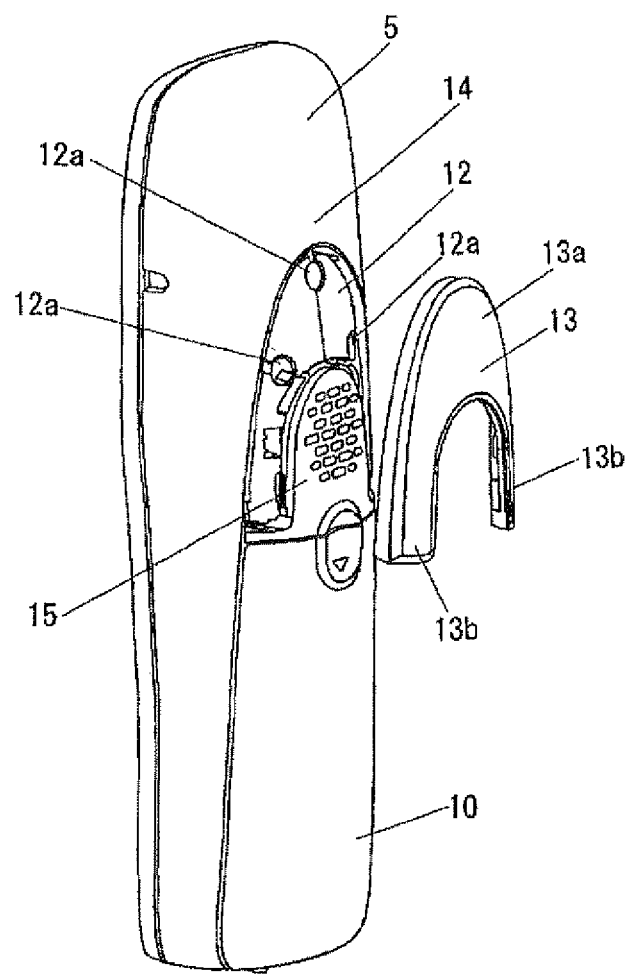
FIG. 6 is a perspective view of a back surface side of the telephone in the first embodiment.
Figure 7:
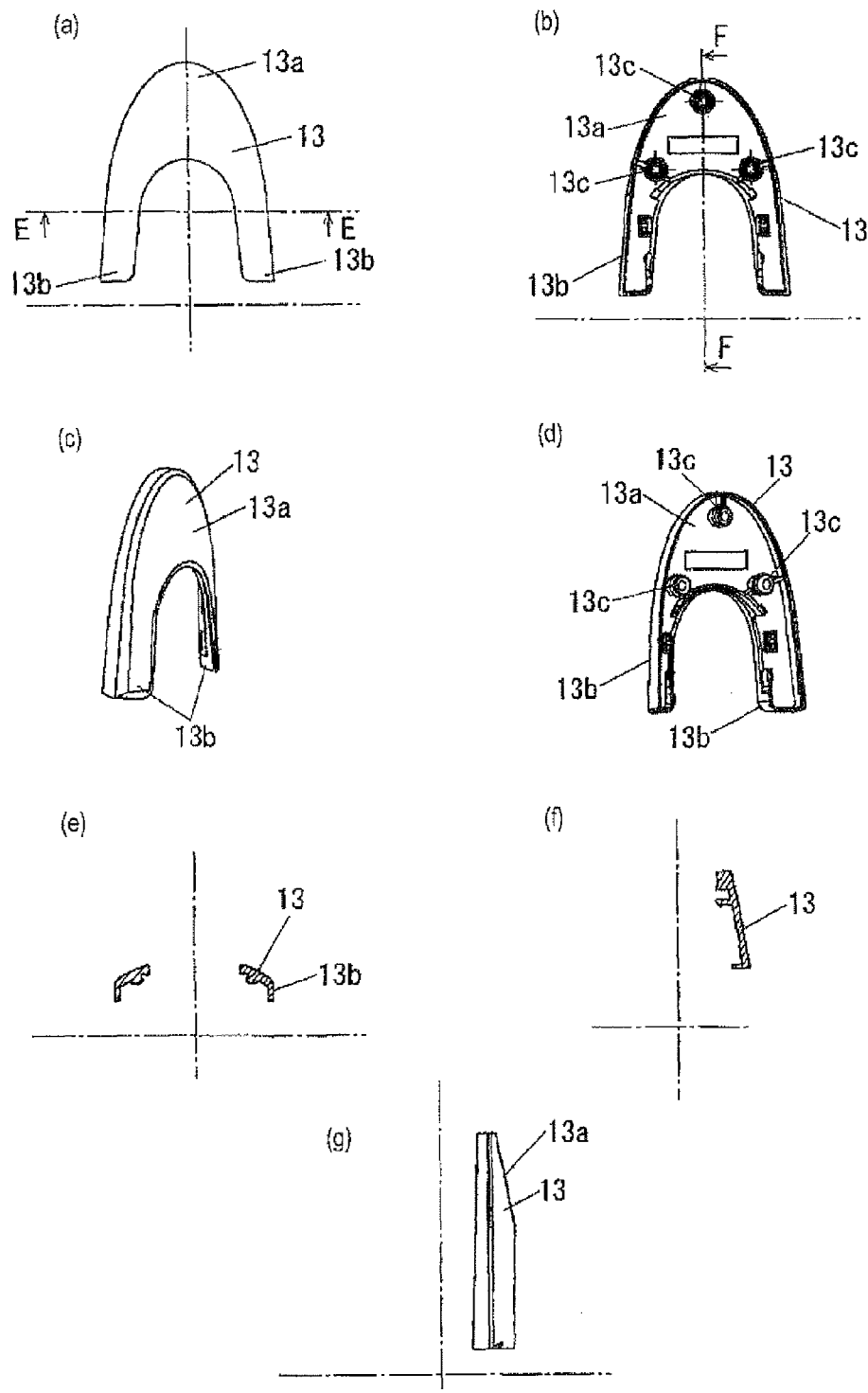
FIG. 7(a) is a front view of the slip preventing part in the first embodiment.
FIG. 7(b) is a rear view of the slip preventing part in the first embodiment.
FIG. 7(c) is a perspective view of a front surface side of the slip preventing part in the first embodiment.
FIG. 7(d) is a perspective view of a back surface side of the slip preventing part in the first embodiment.
FIG. 7(e) is a sectional view taken along a line E-E in FIG. 7(a)
FIG. 7(f) is a sectional view taken along a line F-F in FIG. 7(b).
FIG. 7(g) is a side view of the slip preventing part in the first embodiment.

In the slip preventing unit 11, as shown in FIG. 5 and FIG. 6, a flexible slip preventing part (made of rubber as one example) 13 is detachably attached to a recessed part 12 provided as an attaching part in the back surface side of the main body case 5.

Here, initially, a form of the back surface side of the main body case 5 is described. As can be understood from FIG. 4 to FIG. 6, in the back surface side of the main body case 5, a curved surface 14 is formed whose upper part comes closer to the front surface side in an upper side from a central part in the longitudinal direction and whose parts move more forward in a transverse direction as a direction orthogonal to the longitudinal direction come closer to the front surface side.

Then, as can be understood from FIG. 6 and FIGS. 7(a) to 7(g), the slip preventing part 13 includes a main body part 13a in an upper side and two extending parts 13b extended downward from both sides of a lower end of the main body part 13a so as to have an inverted U shape having an opening in a lower side.

Namely, by forming the inverted U shape in such a way, a lower end side (each extending part 13b) has a width smaller than that of the upper side (the main body part 13a). Thus, when the slip preventing part 13 is detached, the extending parts 13b can be deformed so that the slip preventing part 13 may be easily detached.

Further, the above-described recessed part 12 to which the inverted U shaped slip preventing part 13 is attached is also formed in an inverted U shape as shown in FIG. 6. On the back surface side of the main body case 5 located between both the extending parts 13b of the slip preventing part 13, a receiver 15 is arranged for reproducing, for instance, a caretaking telephone.

In the above-described arrangement relation, the back surface side of the main body part 13a in the upper part of the slip preventing part 13 serves as an arrangement area of a connecting unit to the main body case 5. Specifically, as shown in FIGS. 7(a) and 7(b), three protrusions 13c as the connecting unit are arranged in a triangular form having an upper part as a vertex.

Further, the extending parts 13b of the slip preventing part 13 serve as areas where the connecting unit to the main body case 5 is not arranged, so that the extending parts are easily deformed during a detaching operation.

Further, in the recessed part 12 of the main body case 5, as shown in FIG. 6, three recessed parts 12a as a connecting unit are arranged in a triangular form having an upper part as a vertex so as to correspond thereto.

The slip preventing part 13 having the above-described structure is attached to the recessed part 12 as described above. At this time, the three protrusions 13c as the connecting unit of the slip preventing part 13 are pushed in to the three recessed parts 12a as the connecting unit in the recessed part 12 by using an elasticity of the protrusions 13c. Thus, as shown in FIGS. 3(a) to 3(d), an attachment is finished.

It is important herein that an outer peripheral surface of the slip preventing part 13, specifically, the lower ends of all the outer peripheral surfaces of the main body part 13a and the extending parts 13b are more fitted, inserted and arranged into the main body case 5 than a surface of the back surface side of the main body case 5, as can be understood from FIGS. 3(a) to 3(d).

Namely, when the slip preventing part 3 is stained or broken, the slip preventing part 13 is replaced by a new slip preventing part. During a replacement of the slip preventing part, it is important to simply carry out the replacement and prevent the slip preventing part from unexpectedly slipping out during an ordinary use except the replacement.

Thus, in this embodiment, the flexible slip preventing part 13 is detachably attached to the recessed part 12.

Accordingly, when the slip preventing unit is stained or broken, if the lower end sides of the extending parts 13b of the slip preventing part 13 are pressed toward a direction of a central axis (5a in FIG. 3(a)) in the longitudinal direction of the main body case 5, for instance by a finger, the extending parts 13b are easily deformed due to a flexibility thereof. Thus, initially, the extending parts 13b slip outside from the recessed part 12.

Then, under this state, when the extending parts 13b slipping outside from the recessed part 12 are pinched by fingers to pull them outward the main body case 5, the three protrusions 13c simply slip out from the three recessed parts 12a as the connecting unit due to an elastic deformation of the above-described three protrusions 13c as the connecting unit of the slip preventing part 13. Thus, the slip preventing part 13 can be simply detached from the recessed part 12 (the attaching part) of the main body case 5.

Further, a newly attached slip preventing part 13 can be deformed by using its flexibility and also simply attached to the recessed part 12 (the attaching part) of the main body case 5. During an attachment, initially, the three protrusions 13c as the connecting unit of the slip preventing part 13 are elastically deformed, pushed in and connected to the three recessed parts 12a as the connecting unit in the recessed part, and then, the extending parts 13b are pushed in to the recessed part 12.

As described above, when the slip preventing part 13 is stained or broken, the flexibility of the slip preventing part 13 can be used to simply replace the slip preventing part by another slip preventing part.

As described above, it is important herein that the outer peripheral surface of the slip preventing part 13, specifically, the lower ends of all the outer peripheral surfaces of the main body part 13a and the extending parts 13b are more fitted, inserted and arranged into the main body case 5 than the surface of the back surface side of the main body case 5, as can be understood from FIGS. 3(a) to 3(d).

Namely, since all the outer peripheral surface of the slip preventing part 13 is more fitted, inserted and arranged into the main body case 5 than the surface of the back surface side of the main body case 5, that is, all the periphery of the outer peripheral surface of the slip preventing part 13 is sunk in the back surface of the main body case 5.

Therefore, during an ordinary use, when the outer peripheral surface of the slip preventing part 13 is merely pressed, the slip preventing part 13 is hardly deformed. Accordingly, the slip preventing part 13 does not unexpectedly slip out from the recessed part 12 (the attaching part) of the main body case 5 to obtain an extremely good serviceability.

Further, in this embodiment, the outer peripheral surface of the slip preventing part 13, specifically, both the main body part 13a and the extending parts 13b are inclined in the direction of the outer periphery of the main body case 5.

At this time, the two extending parts 13b respectively have outer sides and inner sides in their structures. As can be understood from FIGS. 3(a) to 3(d), both the outer sides and the inner sides of the extending parts 13b are more inclined toward the direction of the outer periphery of the main body case 5 in lower parts thereof than in upper parts thereof.

Similarly in the recessed part 12 of the main body case 5, a lower part of an outer peripheral surface thereof is more inclined toward the direction of the outer periphery of the main body case 5 than an upper part thereof so as to correspond thereto.

Accordingly, as described above, during the replacement of the slip preventing part 13, the lower end sides of the extending parts 13b are pressed toward the direction of the central axis (5a in FIG. 3(a)) in the longitudinal direction of the main body case 5, for instance, by a finger.

Namely, as can be understood from FIGS. 3(a) to 3(d), since both the outer sides and the inner sides of the extending parts 13b of the slip preventing part 13 are more inclined toward the direction of the outer periphery of the main body case 5 in the lower parts thereof than in the upper parts thereof. Similarly in the recessed part 12 of the main body case 5, since the lower part of the outer peripheral surface thereof is more inclined toward the direction of the outer periphery of the main body case 5 than the upper part thereof, during the replacement of the slip preventing part 13, when the lower end sides of the extending parts 13b are pressed toward the direction of the central axis (5a in FIG. 3(a)) in the longitudinal direction of the main body case 5, for instance, by a finger, the extending parts 13b can be simply detached along an inclination.

Second Embodiment

Figure 8:
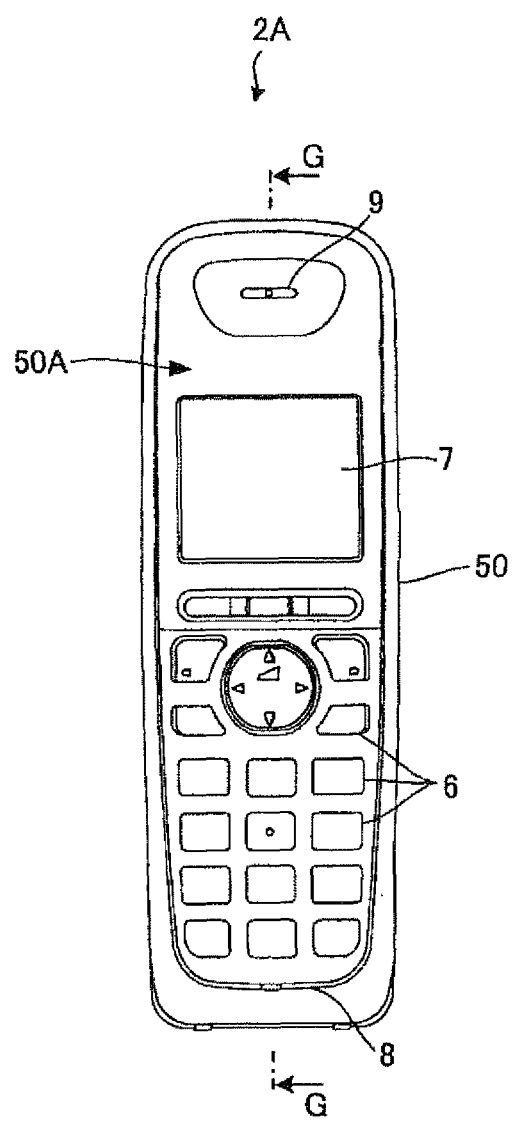
FIG. 8 is a front view of a telephone in a second embodiment.

A second embodiment is described by referring to FIG. 8 to FIGS. 18(a) to 18(b). In the drawings of the second embodiment, the same elements as those of the first embodiment are designated by the same reference numerals. A telephone 2A has a main body case 50. The main body case 50 includes, as shown in FIG. 8, a receiver 9, a display part 7, a key operating part 6 and a microphone 8 on a front surface 50A. The receiver 9 outputs an audio received by the telephone 2A. The display part 7 is formed with an LCD (Liquid Crystal Display) to display data received by the telephone 2A or data stored in a memory (not shown in the drawing) in the telephone 2A as an image. The key operating part 6 includes alphanumeric keys and function keys. The microphone 8 receives a voice of a speaker. The receiver 9 and the microphone 8 are respectively arranged in both ends (an upper part and a lower part on a sheet in FIG. 9) of the main body case 50. The display part 7 and the key operating part 6 are arranged between the receiver 9 and the microphone 8. The display part 7 is arranged between the receiver 9 and the key operating part 6.

Figure 9:
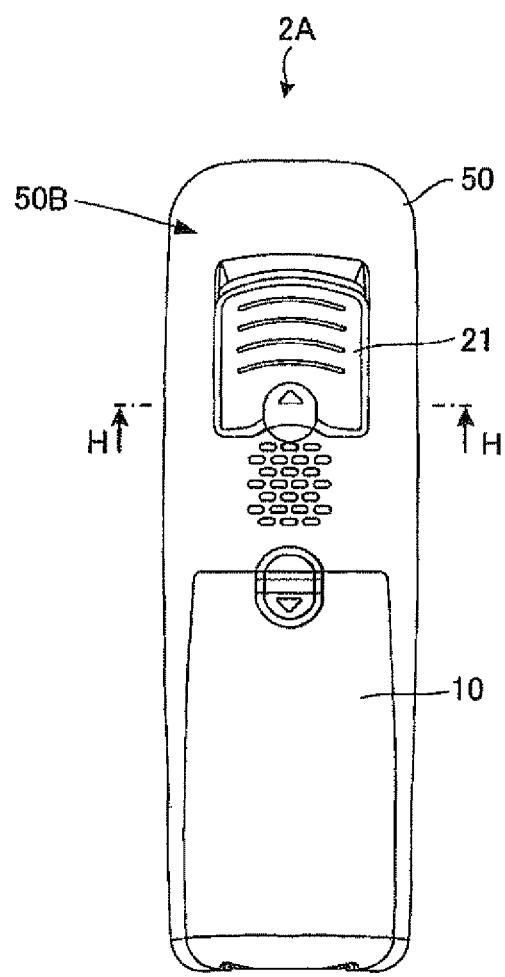
FIG. 9 is a rear view of the telephone in the second embodiment.

As shown in FIG. 9, on a back surface 50B in an opposite side to the front surface 50A (see FIG. 8), a slip preventing part 21 and a power source part 10 are provided. The slip preventing part 21 is provided in an opposite side to the display part 7 (see FIG. 8) on the back surface 50B.

When the telephone 2A having the display part is held by a shoulder, since the display part is ordinarily arranged between the receiver and the microphone, the display part is apt to come into contact with a jaw or a cheek. As compared therewith, in the telephone 2A of the present embodiment, since the slip preventing part 21 is provided in the opposite side to the display part 7 on the back surface 50B of the main body case, the telephone 2A can be firmly held by an entire part of a face and the shoulder. Thus, even when the telephone 2A is miniaturized, the telephone 2A can be prevented from dropping to speak.

Figure 10:
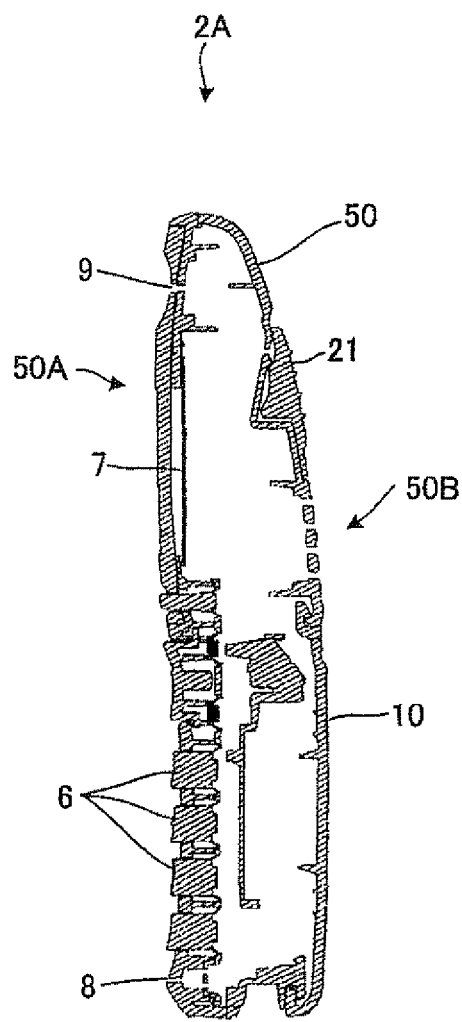
FIG. 10 is a side sectional view (a sectional view taken along a line G-G in FIG. 8) of the telephone in the second embodiment.

FIG. 10 shows a section of a center in the longitudinal direction of the main body case 50. The main body case 50 includes a below-described recessed part 30 in the back surface 50B side (a right part on a sheet surface in FIG. 10) of the main body case. The slip preventing part 21 is accommodated in the recessed part 30. In this case, the slip preventing part 21 is accommodated so as not to protrude form the back surface 50B.

Figure 11:
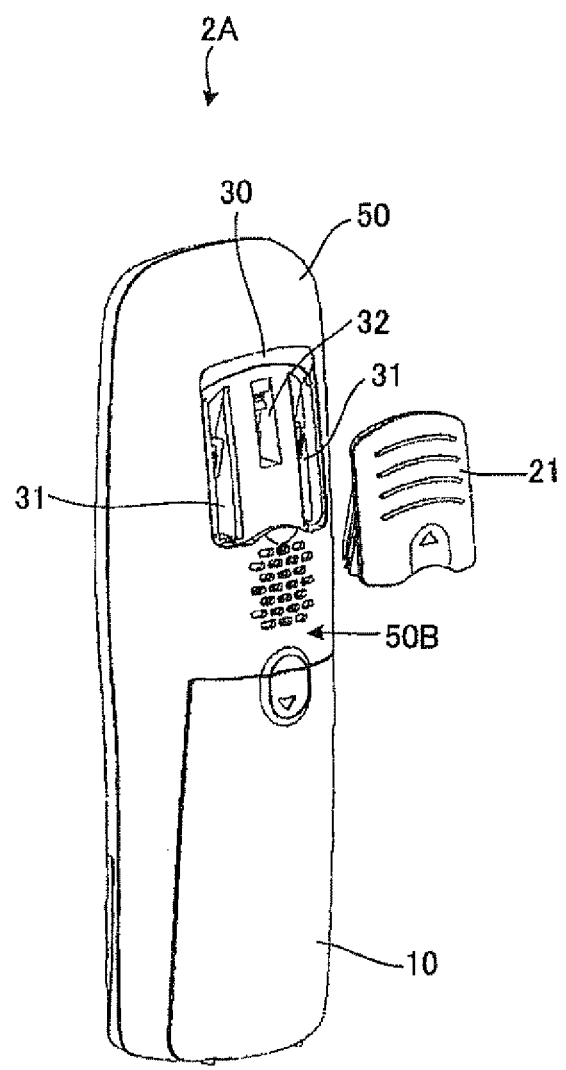
FIG. 11 is a perspective view of a back surface side of the telephone when a slip preventing part is removed in the second embodiment.

As shown in FIG. 11, the recessed part 30 has the same form as that of the slip preventing part 21. As shown in FIG. 9, since the slip preventing part 21 is accommodated in the recessed part 30 so that an outer periphery of the slip preventing part 21 comes into contact with an outer periphery of the recessed part 30, the recessed part 30 is covered with the slip preventing part 21.

Figure 12:
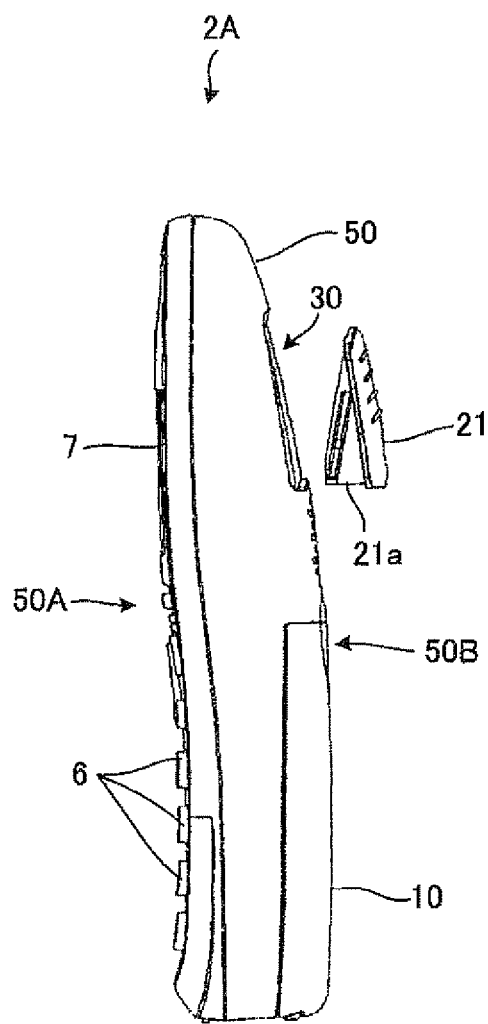
FIG. 12 is a side view of the telephone when the slip preventing part is detached in the second embodiment.
Figure 13:
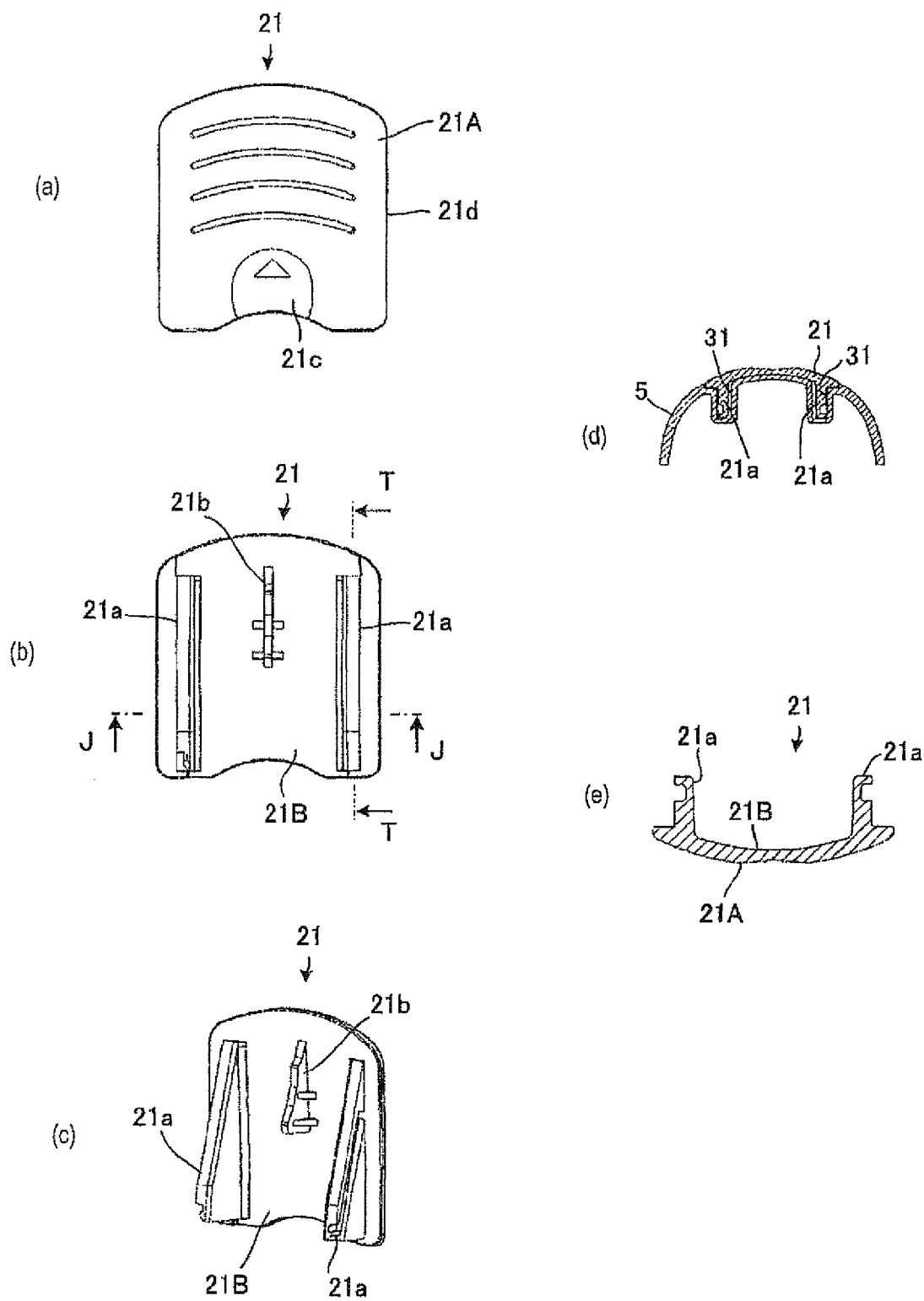
FIG. 13(a) is a front view of the slip preventing part in the second embodiment.
FIG. 13(b) is a rear view of the slip preventing part in the second embodiment.
FIG. 13(c) is a perspective view of a back surface side of the slip preventing part in the second embodiment.
FIG. 13(d) is a sectional view (a sectional view taken along a line H-H in FIG. 9) of the slip preventing part attached to a recessed part in the second embodiment.
FIG. 13(e) is a sectional view (a sectional view taken along a line J-J in FIG. 13(b)) of the slip preventing part in the second embodiment.

The recessed part 30 has two rails 31 and 31 and a groove part 32 therein. The rails 31 and 31 are formed in the shapes of grooves along the longitudinal direction (a vertical direction on a sheet surface in FIG. 11) of the main body case 50. The groove part 32 is arranged at a center of the rails 31 and 31. As shown in FIG. 12, the slip preventing part 21 has a below-described support part 21a provided in the recessed part 30 side.

As shown in FIG. 13(a), the slip preventing part 21 has a plate 21d. The plate 21d has an outer wall surface 21A. On the outer wall surface 21A, a push-in part 21c is provided. The push-in part 21c is recessed so that a user arranges a finger thereon to easily push in the slip preventing part 21 when the slip preventing part 21 is moved.

As shown in FIG. 13(b), the plate 21d has an inner wall surface 21B as a back surface side of the outer wall surface 21A. As shown in FIGS. 13(b) and 13(c), the two support parts 21a are provided in the inner wall surface 21B. The two support parts 21a are formed substantially in triangular shapes. Between the two support parts 21a, a guide 21b is provided.

Figure 14:
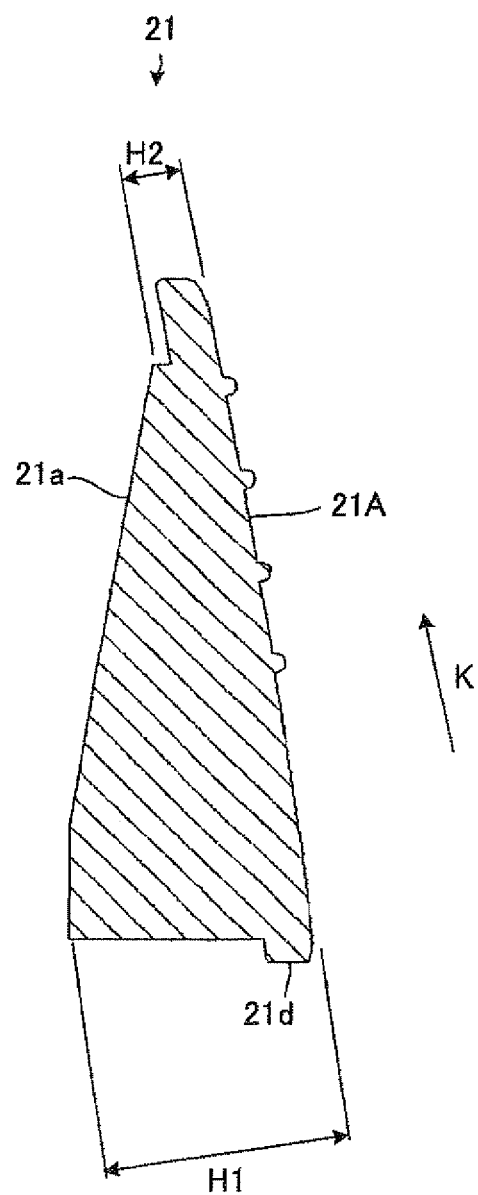
FIG. 14 is a side sectional view (a sectional view taken along a line T-T in FIG. 13(b)) of the slip preventing part in the second embodiment.

A symbol K shown in FIG. 14 shows a below-described movable direction of the slip preventing part 21. The support part 21a has heights H1 and H2 from the outer wall surface 21A. The height H1 shows a maximum height and the height H2 shows a minimum height. Accordingly, the heights H1 and H2 are different heights.

As shown in FIG. 13(d), the two support parts 21a and 21a are respectively attached to the rails 31 and 31 in the recessed part 30. As shown in FIG. 13(e), the outer wall surface 21A of the slip preventing part 21 is bent. The slip preventing part 21 is accommodated in the recessed part 30. The recessed part 30 is formed, as shown in FIG. 10, so that the outer wall surface 21A does not protrude from the back surface 50B of the main body case 50. Further, the outer wall surface 21A is bent along the back surface 50B. Under a state that the slip preventing part 21 is accommodated in the recessed part 30, the user can speak without an uneasy feeling due to the protrusion of the slip preventing part 21.

Figure 15:
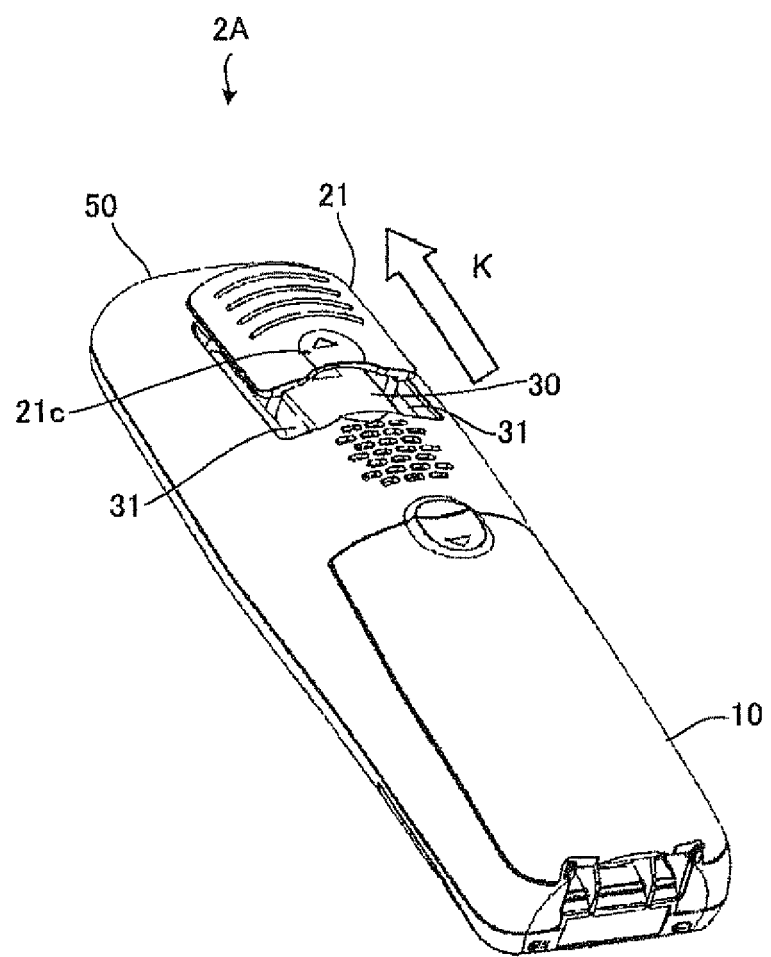
FIG. 15 is a perspective view of the back surface side of the telephone when the slip preventing part is moved in the second embodiment.
Figure 16:
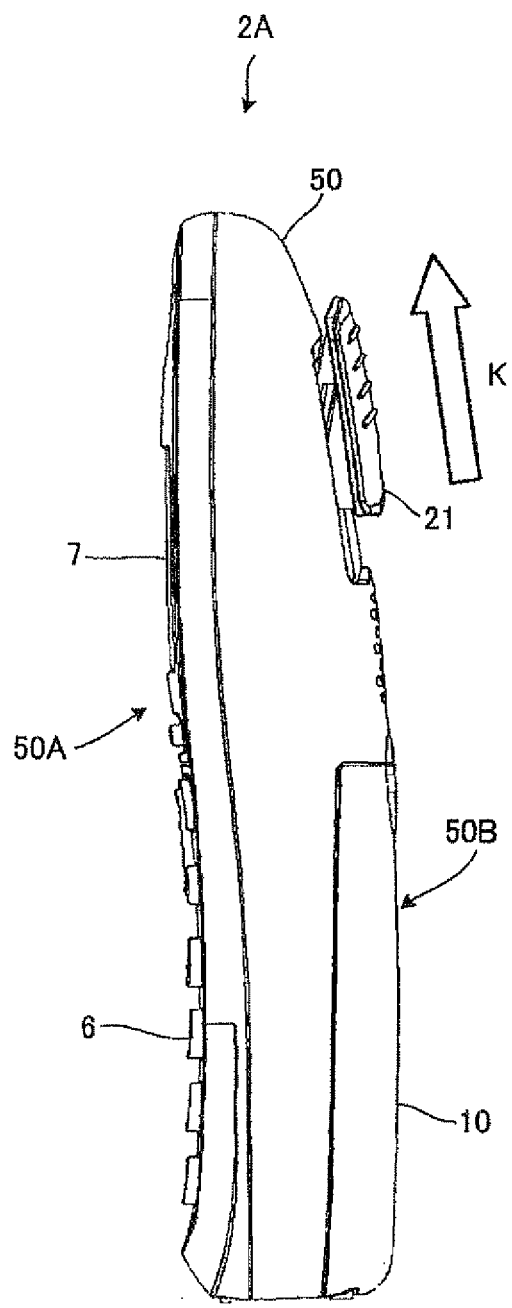
FIG. 16 is a side view of the telephone when the slip preventing part is moved in the second embodiment.
Figure 17:
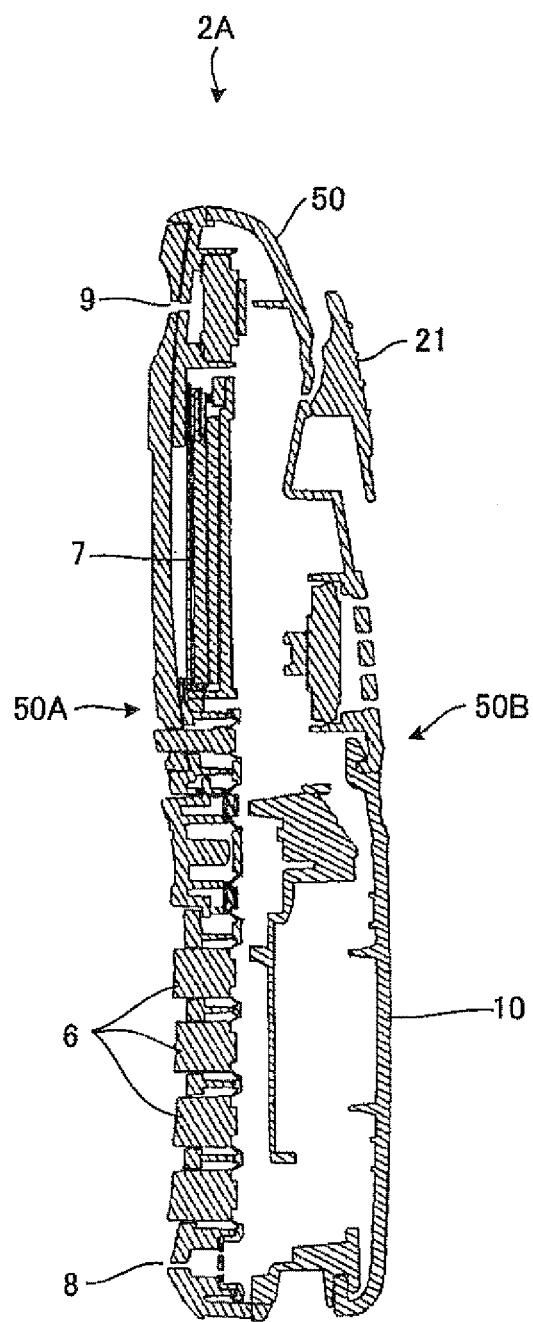
FIG. 17 is a side sectional view (a sectional view taken along a line G-G in FIG. 8) of the telephone when the slip preventing part is moved in the second embodiment.
Figure 18:
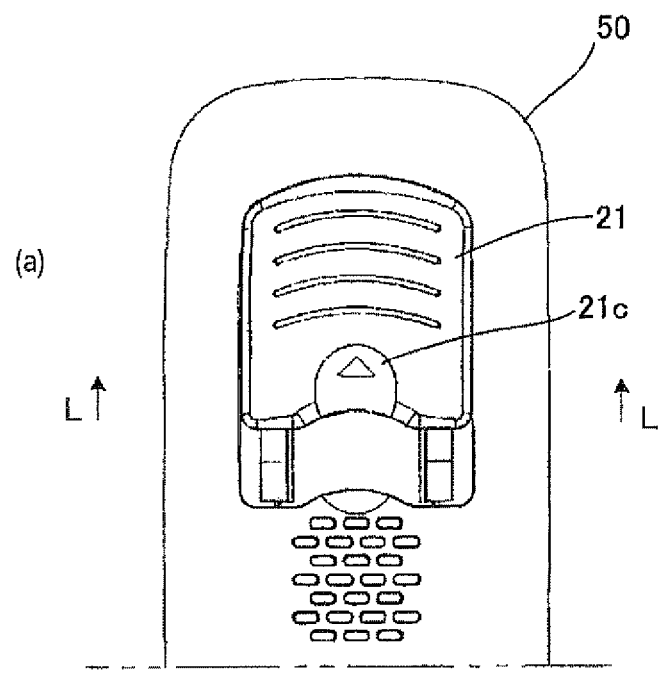
FIG. 18(a) is a partly extracted and enlarged rear view of the telephone in the second embodiment.
FIG. 18(b) is a sectional view (a sectional view taken along a line L-L in FIG. 18(a)) of the slip preventing part attached to a recessed part when the slip preventing part is moved and an enlarged view of a part T.
Figure 18:
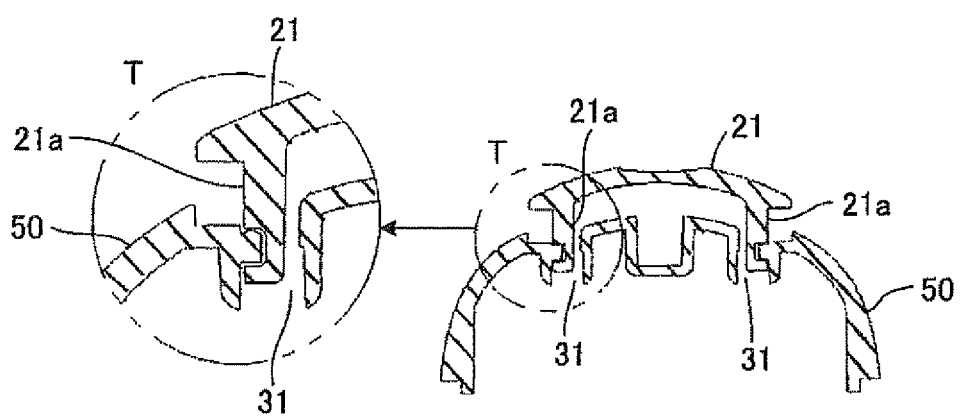

Under a state that the slip preventing part 21 is attached to the recessed part 30, when the user pushes in the push-in part 21c along the movable direction K shown in FIG. 15, the support parts 21a and 21a start to move along the rails 31 and 31. The rails 31 and 31 are formed in the same shapes as those of the support parts 21a and 21a. Accordingly, when the support parts 21a and 21a move toward the movable direction K, since the parts of the height H1 (the highest) of the support parts 21a and 21a move to shallow parts from deep parts of the rails 31 and 31, the outer wall surface 21A (see FIG. 14) floats from the back surface 50B as shown in FIGS. 16 and 17.

As shown in FIGS. 18(a) and 18(b), recessed parts of the support parts 21a may be fitted to protrusions of the rails 31 to freely move the slip preventing part 21.

As described above, in the present embodiment, when the user merely pushes in the slip preventing part 21, the slip preventing part 21 can be allowed to float from the back surface 50B of the main body case 50. Thus, even when one hand is engaged during speaking, the slip preventing part 21 can be set by a simple operation.

Third Embodiment

Figure 19:
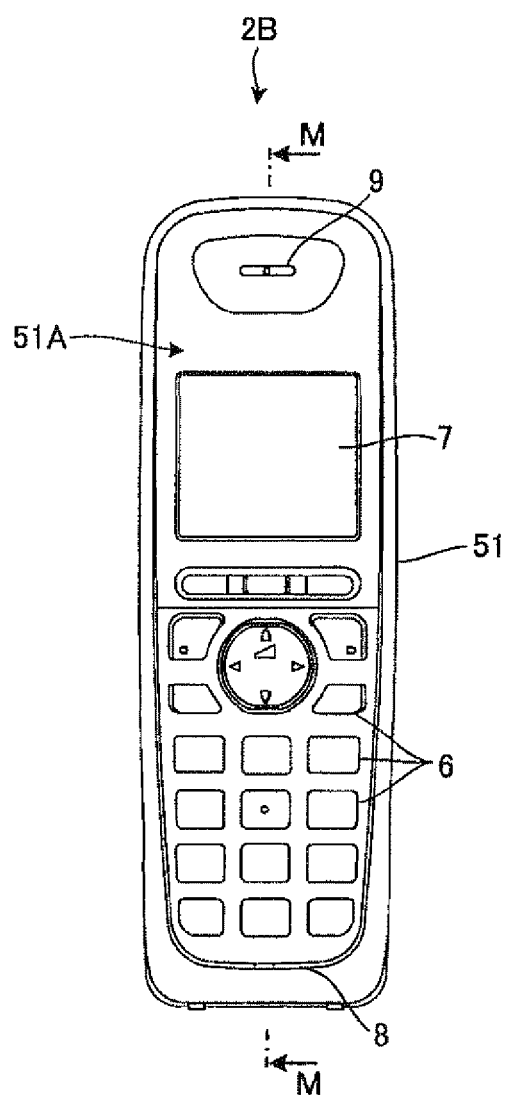
FIG. 19 is a front view of a telephone in a third embodiment.

A third embodiment is described by referring to FIG. 19 to FIG. 30. In the drawings of the third embodiment, the same elements as those of the first embodiment are designated by the same reference numerals. A telephone 2B has a main body case 51. The main body case 51 includes, as shown in FIG. 19, a receiver 9, a display part 7, a key operating part 6 and a microphone 8 on a front surface 51A.

Figure 20:
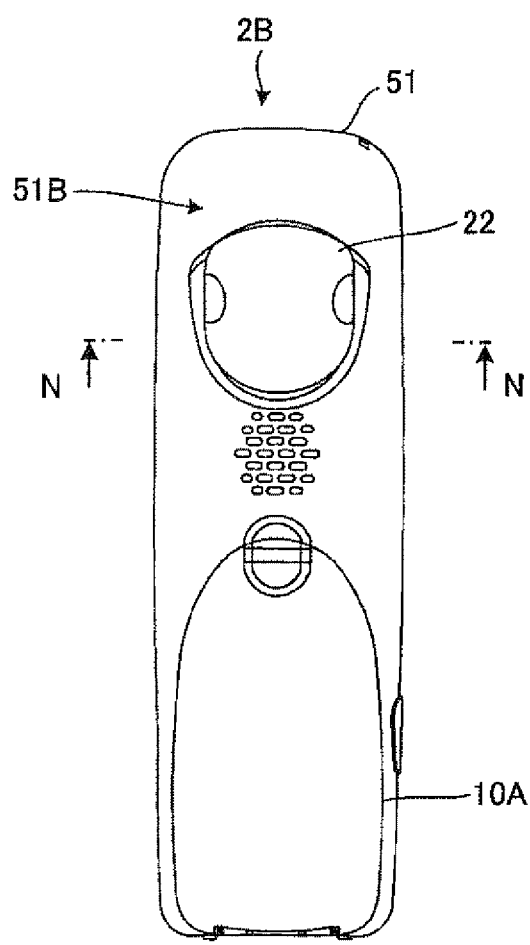
FIG. 20 is a rear view of the telephone in the third embodiment.

As shown in FIG. 20, on a back surface 51B in an opposite side to the front surface 51A (see FIG. 19), a slip preventing part 22 and a power source part 10A are provided. The slip preventing part 22 is provided in an opposite side to the display part 7 (see FIG. 19) on the back surface 51B. Accordingly, similarly to the second embodiment, since the telephone 2B can be firmly held by an entire part of a face and a shoulder, even when the telephone 2B is miniaturized, the telephone 2B can be prevented from dropping to speak.

Figure 21:
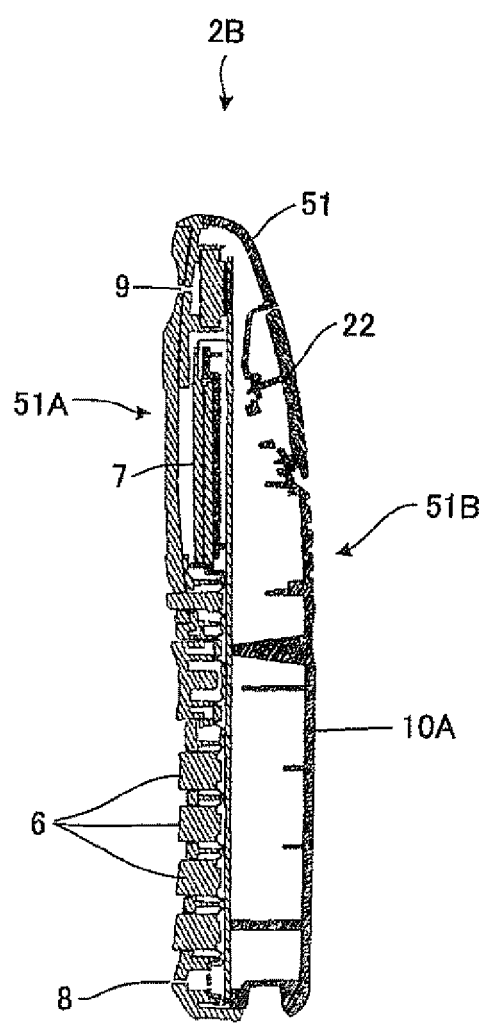
FIG. 21 is a side sectional view (a sectional view taken along a line M-M in FIG. 19) of the telephone in the third embodiment.
Figure 23:
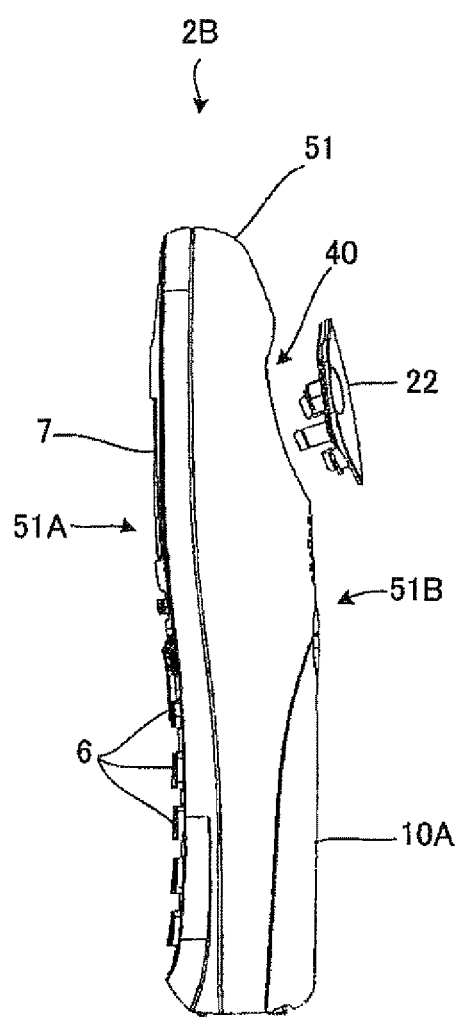
FIG. 23 is a side view of the telephone when the slip preventing part is detached in the third embodiment.
Figure 24:
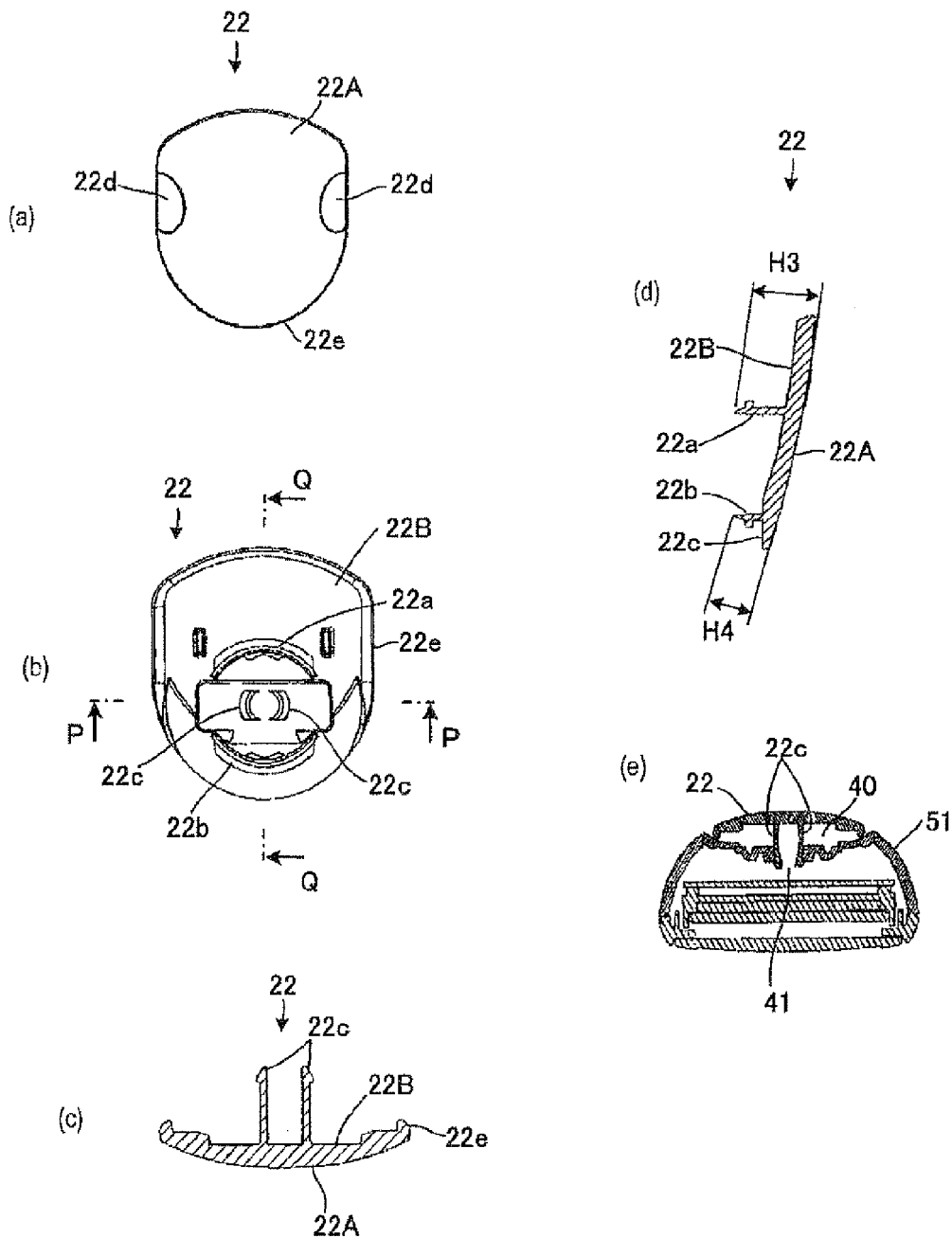
FIG. 24(a) is a front view of the slip preventing part in the third embodiment.
FIG. 24(b) is a rear view of the slip preventing part in the third embodiment.
FIG. 24(c) is a sectional view (a sectional view taken along a line P-P in FIG. 24(b)) of the slip preventing part in the third embodiment.
FIG. 24(d) is a sectional view (a sectional view taken along a line Q-Q in FIG. 24(b)) of the slip preventing part in the third embodiment.
FIG. 24(e) is a sectional view (a sectional view taken along a line N-N in FIG. 20) of the slip preventing part attached to a recessed part in the third embodiment.

As shown in FIG. 21 and FIG. 23, the main body case 51 includes a recessed part 40 in the back surface 51B side. The slip preventing part 22 is accommodated in the recessed part 40. In this case, the slip preventing part 22 is accommodated so as not to protrude form the back surface 51B.

Figure 22:
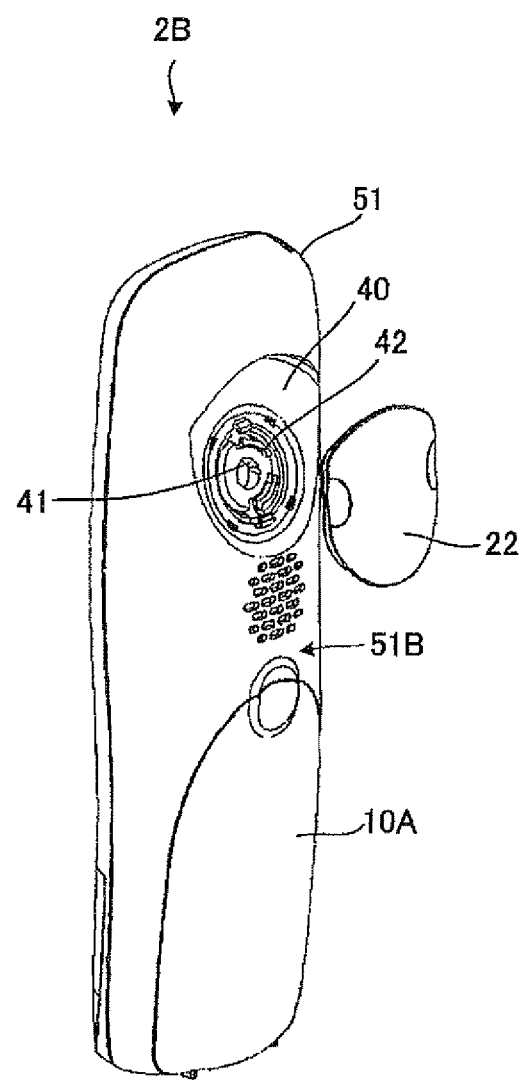
FIG. 22 is a perspective view of a back surface side of the telephone when a slip preventing part is removed in the third embodiment.

As shown in FIG. 22, the recessed part 40 has the same form as that of the slip preventing part 22. As shown in FIG. 20, since the slip preventing part 22 is accommodated in the recessed part 40 so that an outer periphery of the slip preventing part 22 comes into contact with an outer periphery of the recessed part 40, the recessed part 40 is covered with the slip preventing part 22. The recessed part 40 has an annular rail 42 therein. A shaft groove 41 is provided in a center of the annular rail 42.

As shown in FIG. 24(a), the slip preventing part 22 has a plate 22e. The plate 22e has an outer wall surface 22A. On the outer wall surface 22A, two push-in parts 22d and 22d are provided. The push-in parts 22d are recessed similarly to the second embodiment.

Figure 25:
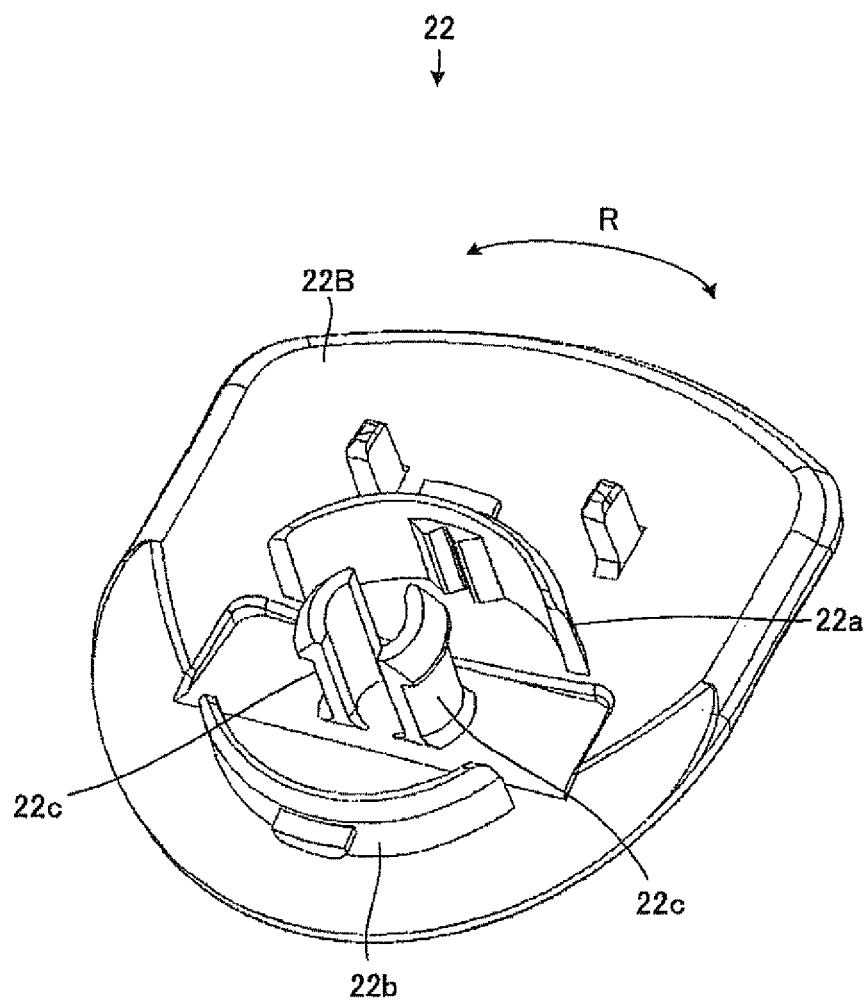
FIG. 25 is a perspective view of a back surface side of the slip preventing part in the third embodiment.

As shown in FIG. 24(b), the plate 22e has an inner wall surface 22B as a back surface side of the outer wall surface 22A. As shown in FIGS. 24(b) and 24(c), rotating shafts 22c and 22c are provided on the inner wall surface 22B. As shown in FIG. 25, on the inner wall surface 22B, two support parts 22a and 22b are concentrically provided about the rotating shafts 22c and 22c.

A symbol R shown in FIG. 25 shows a movable direction (described below) of the slip preventing part 22. The support parts 22a and 22b respectively have heights H3 and H4 from the outer wall surface 22A as shown in FIG. 24(d). The heights have a relation expressed by H3>H4 and the heights H3 and H4 are different heights.

As shown in FIG. 24(e), the two support parts 22a and 22b are respectively attached to the annular rail 42 in the recessed part 40. At the same time, the rotating shafts 22c and 22c are inserted into the shaft groove 41. As shown in FIG. 24(c), the outer wall surface 22A of the slip preventing part 22 is bent. The recessed part 40 is formed, as shown in FIG. 21, so that the outer wall surface 22A does not protrude from the back surface 51B of the main body case 51.

Further, the outer wall surface 22A is bent along the curvature of the back surface 51B. Under a state that the slip preventing part 22 is accommodated in the recessed part 40, a user can speak without an uneasy feeling due to the protrusion of the slip preventing part 21.

Figure 26:
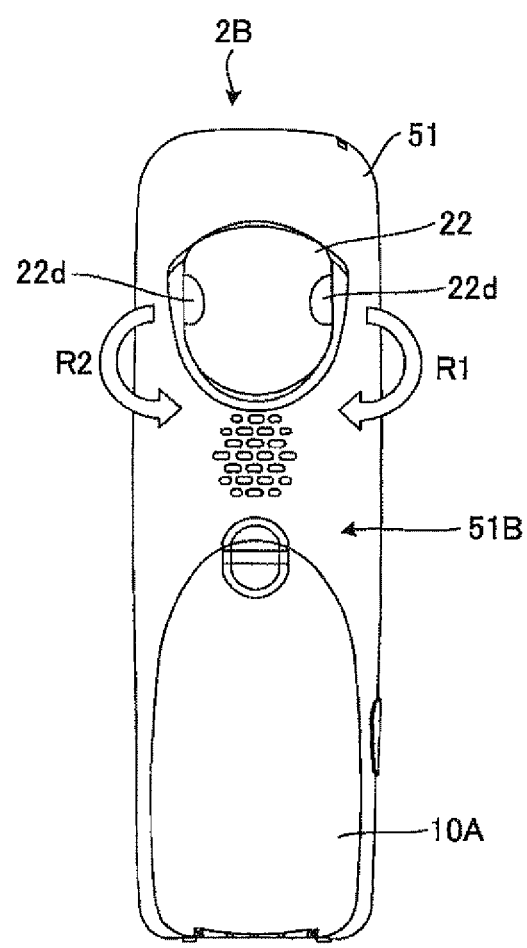
FIG. 26 is a rear view of the telephone showing a rotating direction in the third embodiment.
Figure 27:
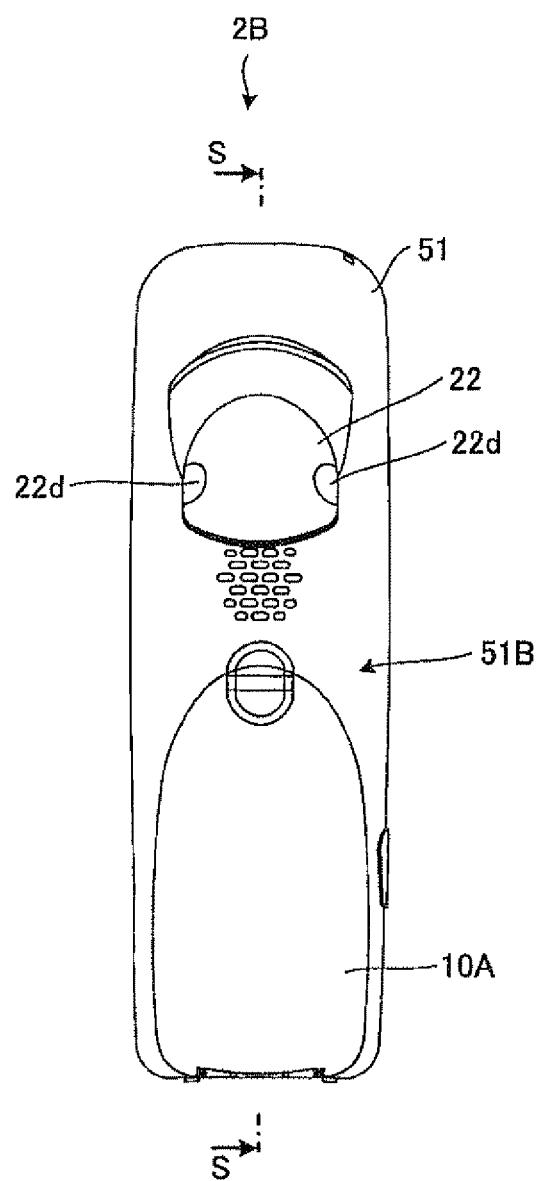
FIG. 27 is a rear view of the telephone when the slip preventing part is rotated in the third embodiment.
Figure 29:
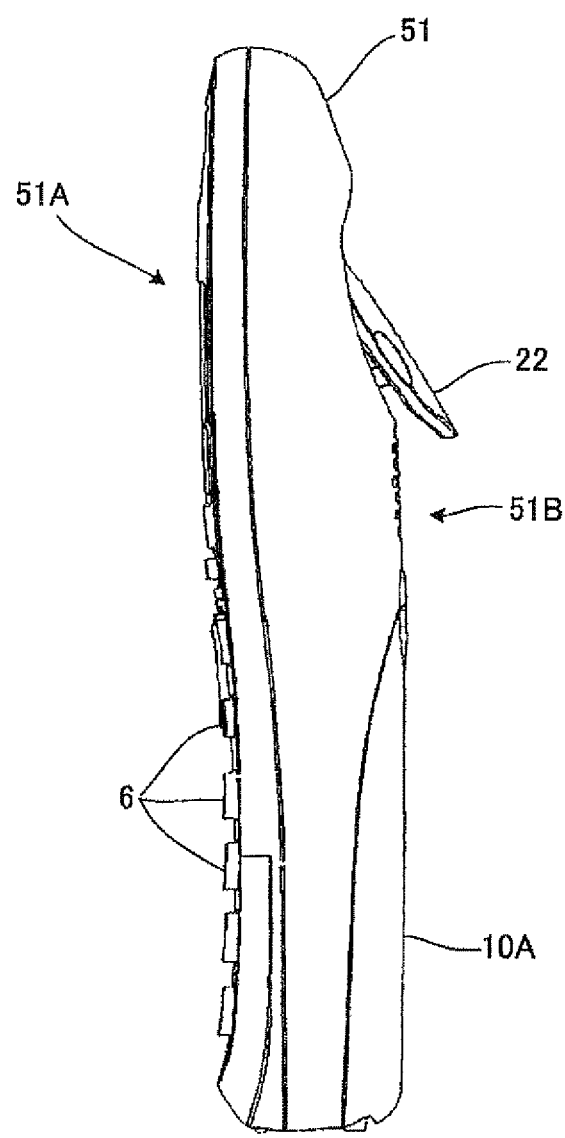
FIG. 29 is a side view of the telephone when the slip preventing part is rotated in the third embodiment.
Figure 30:
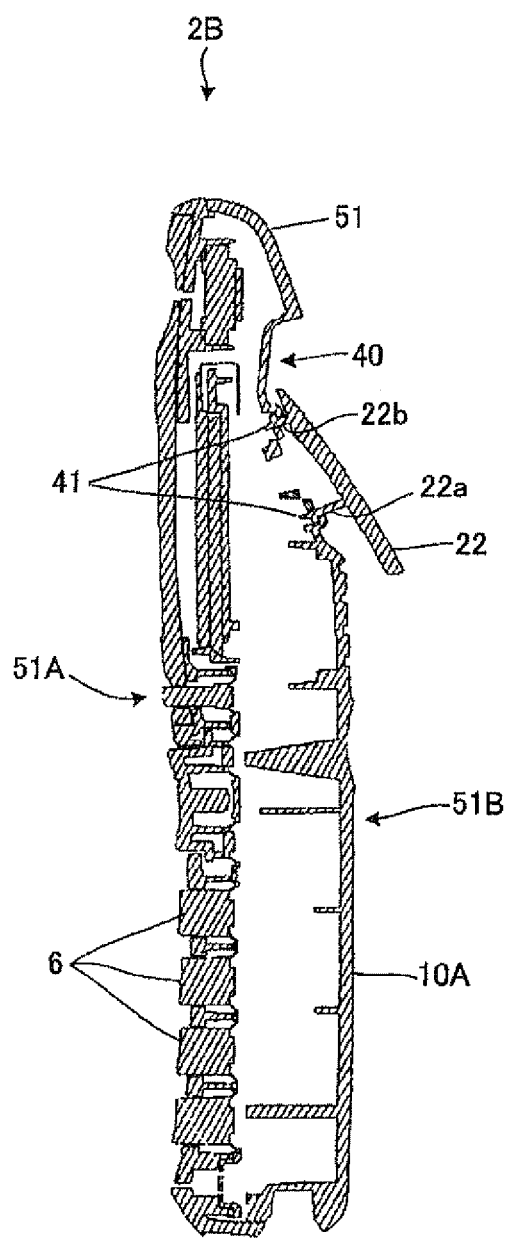
FIG. 30 is a side sectional view (a sectional view taken along a line S-S in FIG. 27) of the telephone when the slip preventing part is rotated in the third embodiment.

When the user pushes in the push-in parts 22d and 22d along the movable direction R1 or R2 shown in FIG. 26, the support parts 22a and 22b start to move along the annular rail 42. When the slip preventing part 22 is rotated about the rotating shafts 22c and 22c and rotated by 180°, the slip preventing part 22 is reversely rotated as shown in FIG. 27. The depth of the annular rail 42 into which the support parts 22a and 22b are inserted corresponds to the height of each of the support parts. Namely, the depth of the annular rail 42 into which the support part 22a is inserted corresponds to the height H3 and the depth of the annular rail 42 into which the support part 22b corresponds to the height H4. When the slip preventing part 22 is rotated by 180°, the support part 22a moves to the annular rail 42 corresponding to the height H4 and the support part 22b moves to the annular rail 42 corresponding to the height H3. Thus, as the slip preventing part 22 is more rotated, the outer wall surface 22A of the slip preventing part 22 floats from the back surface 51B as shown in FIGS. 28 to 30.

As described above, in the present embodiment, when the user merely pushes in the slip preventing part 22, the slip preventing part 22 can be allowed to float from the back surface of the main body case 51. Thus, even when one hand is engaged during speaking, the slip preventing part 22 can be set by a simple operation.

Figure 28:
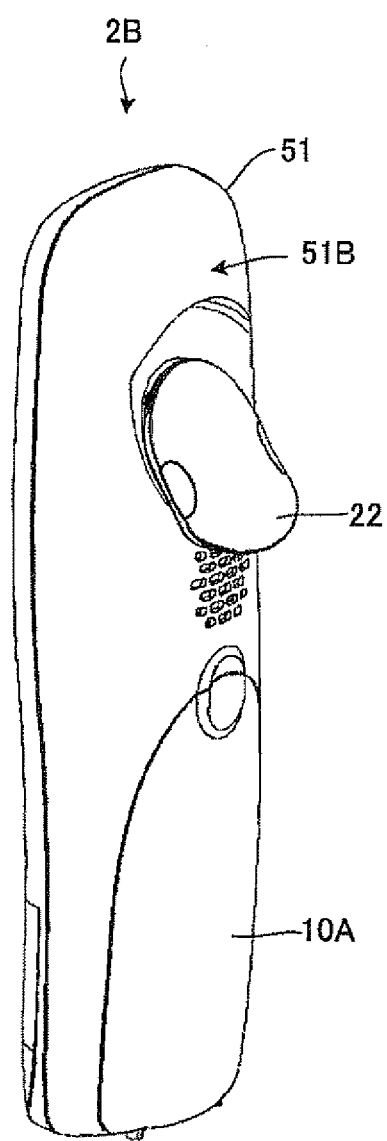
FIG. 28 is a perspective view of the back surface side of the telephone when the slip preventing part is rotated in the third embodiment.

Further, since the plate 22e of the slip preventing part 22 is directed downward relative to a sheet surface in FIG. 28 to float, which is different from the second embodiment, the telephone can be more assuredly hooked on the shoulder.

The telephones 2, 2A and 2B respectively described in the embodiments may be applied to any of a fixed telephone such as a cordless telephone and a portable telephone.

The present invention is described in detail by referring to the specific embodiments, however, it is apparent to a person with ordinary skill in the art that various kinds of changes or modifications may be made without deviating the spirit and scope of the present invention.

This application is based on Japanese Patent Application No. 2009-169889 filed on Jul. 21, 2009, and contents thereof are incorporated herein as a reference.

INDUSTRIAL APPLICABILITY

As described above, according to the present invention, when the slip preventing unit is stained or broken, the slip preventing unit can be simply replaced by a new slip preventing unit, and the present invention may be applied to a telephone having a cord, a cordless telephone or a portable telephone.

DESCRIPTION OF REFERENCE NUMERALS AND SIGNS

1 ... user 2, 2A, 2B ... telephone 3 ... ear 4 ... shoulder 5, 50, 51 ... main body case 6 ... key operating part 7 ... display part 8 ... microphone 9 ... receiver 10, 10A ... power source part 11 ... slip preventing unit 12, 12a, 30, 40 ... recessed part 13, 21, 22 ... slip preventing part 13a ... main body part 13b ... extending part 13c ... protrusion 14 ... bent surface 15 ... receiver 21A, 22A ... outer wall surface 21B, 22B ... inner wall surface 21a ... support part 21b ... guide 21c ... push-in part 21d ... plate 22a, 22b ... support part 22c ... rotating shaft 22d ... push-in part 22e ... plate 32 ... groove part 41 ... shaft groove 42 ... annular rail 50A, 51A ... front surface of main body case 50B, 51B ... back surface of main body case

The invention claimed is:

1. A telephone comprising:
a main body case having a front surface and a back surface,
wherein the front surface is provided with a receiver that outputs an audio, a microphone and a display part, the back surface is provided with a slip preventing part, the display part is arranged between the receiver and the microphone, and the slip preventing part is arranged on the back surface opposite the display part,
wherein the slip preventing part is detachably attached to an attaching part formed on the back surface of the main body case, and, in the attached state, an outer peripheral surface of the slip preventing part is inserted into the back surface of the main body case.

2. The telephone according to claim 1, wherein the attaching part formed on the back surface of the main body case is recessed and the slip preventing part is attached to the recessed part.

3. The telephone according to claim 2, wherein an outer peripheral surface of the recessed part is inclined along a direction of an outer periphery of the main body case.

4. The telephone according to claim 3, wherein the outer peripheral surface of the slip preventing part is inclined along the direction of the outer periphery of the main body case.

5. The telephone according to claim 1, further comprising a bent surface which is inclined towards the front surface side is formed on the back surface of the main body case.

6. The telephone according to claim 1, wherein the slip preventing part has an inverted U shape.

7. The telephone according to claim 6, wherein the slip preventing part includes a main body part and two extending parts extended from the main body part, and the extending parts are inclined along the direction of the outer periphery of the main body case.

8. The telephone according to claim 7, further comprising a connecting unit which can be connected to the main body case is provided in the main body part of the slip preventing part.

9. The telephone according to claim 8, wherein the connecting unit is provided only in the main body part.

10. The telephone according to claim 7, further comprising another receiver provided in the back surface of the main body case.

11. The telephone according to claim 1, wherein the slip preventing part is a flexible member.

12. The telephone according to claim 1, wherein the slip preventing part includes an outer wall surface and support parts provided on a back surface of the outer wall surface, the back surface of the main body case includes the recessed part that accommodates the slip preventing part and attaches the support parts of the slip preventing part so as to be movable, and the support parts have different heights from the outer wall surface along a movable direction of the slip preventing part.

13. The telephone according to claim 12, wherein the recessed part accommodates the slip preventing part so that the outer wall surface does not protrude from the back surface of the main body case.

14. The telephone according to claim 12, wherein the recessed part is attached to the support parts so that the slip preventing part is linearly movable.

15. The telephone according to claim 14, wherein the recessed part includes rails to which the support parts are attached.

16. The telephone according to claim 12, wherein the support parts are attached to the recessed part so that the slip preventing part is freely rotatable.

17. The telephone according to claim 16, wherein the slip preventing part has a rotating shaft provided on the back surface of the outer wall surface.

18. A telephone comprising:
a main body case having a back surface; and
a slip preventing part provided on the back surface,
wherein the slip preventing part has a main body part and an extending part extended from the main body part,
wherein an outer peripheral surface of the slip preventing part is inserted into the main body case from the back surface.

19. The telephone according to claim 18, wherein the slip preventing part has the opening adjacent the extending part.

20. A telephone comprising:
a main body case having a back surface; and
a slip preventing part provided on the back surface,
wherein the slip preventing part is in a U-shape,
wherein an outer peripheral surface of the slip preventing part is inserted into the main body case from the back surface.

* * * * *